United States Patent Office 3,111,864
Patented Nov. 26, 1963

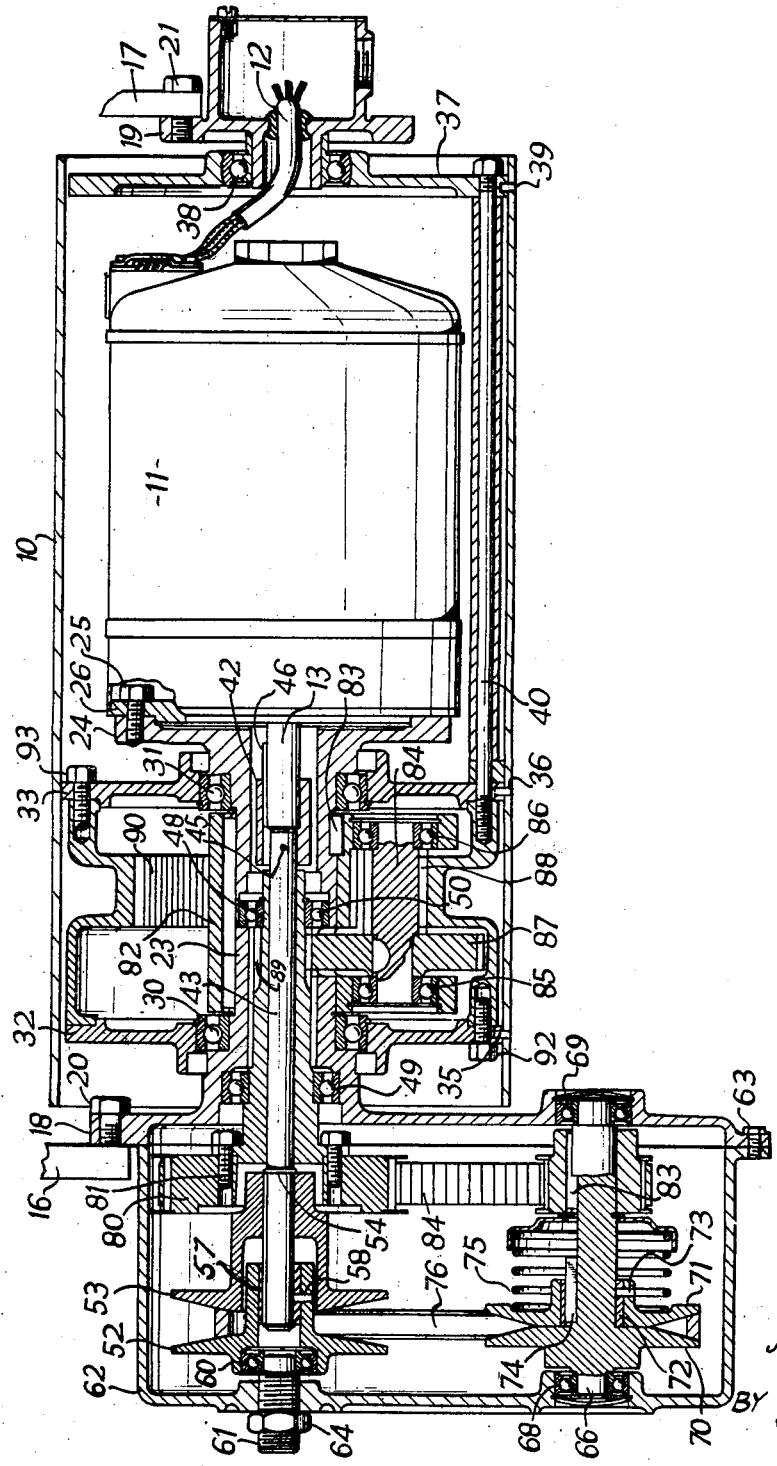

3,111,864
TRANSMISSION FOR USE IN CONVEYOR BELT DRIVES
Joseph Dennis Christian, San Francisco, Calif., assignor to Holo-Flite International Incorporated, San Francisco, Calif.
Filed July 3, 1961, Ser. No. 121,530
5 Claims. (Cl. 74—740)

This invention relates to pulleys for driving conveyor belts and in particular to the types of pulley which contains an electric motor whereby it is driven. In order that such pulleys may find acceptance in industry for a wider range of purposes it is necessary to make the improvements over known pulleys in respect of weight, size, manufacturing cost, durability, quiet running, and selection of pulley drum speed.

Pulley drum speed is of special importance as it is found that some change of speed is frequently required after initial installation. Sometimes it is required to increase the speed of overall output. In other circumstances it is necessary to increase or decrease speed of one conveyor belt to match the speed of another. Again for example in food industries it is necessary to change speed according to seasonal variation in the product e.g. different cooking times or different periods for removing specks from potatoes or other products. This change of speed has necessitated a more or less lengthy task for a mechanic to change sprockets or other parts.

The main object of this invention therefore is to provide a pulley device having a drum which can be driven at speeds which can be quickly and easily varied.

A further object of the invention is to provide a pulley device having a simple fixed ratio internal gearing in tandem with a variable ratio external gearing.

A still further object of the invention is to provide a special bearing arrangement for the pulley drum and internal rotary parts that will ensure quiet running over a long period of operation.

A constructional form of the invention will now be described with reference to the accompanying drawing which is a sectional view of a pulley device made in accordance with the invention.

The device comprises a pulley drum 10 within one end of which is mounted an electric motor 11 by which the drum is driven. The electric flex 12 of the motor extends out of one end of the drum. The motor spindle 13 is coaxial with the drum and located at the inner end of the drum. The pulley is carried by two side plates 16, 17 of a belt conveyor the belt of which (not shown) is driven by the drum. Two mounting plates 18, 19 are fixed by screws 20, 21 to these plates. The plate 18 carries a tube 23 which extends into the drum coaxially therewith and this tube has a flange 24 on its inner end that is fixed by screws 25 to the housing 26 of the motor.

The tube 23 carries two ball bearings 30, 31 on which run two bearing plates 32, 33 located in the drum and fixed thereto by pins 35, 36. A third bearing plate 37 is mounted in the end of the pulley remote from mounting 18 and adjacent the mounting 19 and runs on a ball bearing 38 carried by said mounting 19. The bearing plate 37 is fixed to the drum by pin 39 and is connected to the bearing plate 33 by bolts 40.

The motor spindle 13 is connected by a coupling 42 to the inner end of a shaft 43 that is located coaxially within the drum at the other end thereof and projects at its other end of that end of the drum. The coupling 42 is pinned at 45 to the shaft and engaged slidably on the motor shaft but keyed thereto by a key 46.

Surrounding the shaft 43 is a sleeve 48 which runs in bearings 49, 50 in the tube 23 and projects out of the drum at the same end as the projecting end of the shaft 43.

The shaft 43 is drivably connected to the sleeve by the following means. The shaft carries a first pair of separable sheaves 52, 53. The sheave 53 is slidable on the shaft and limited in one direction by a collar 54 and fixed to the shaft against rotation by a key or spline 55. The sheave 52 is carried on a bush 57 on the shaft and fixed to the bush by a pin 58. The sheave 52 is mounted on a ball bearing 60 carried by a pin 61 which is screw-threaded and located in a tapped hole in a gearing casing 62 which is fixed to the plate 18 by screws 63. A locknut 64 holds the pin 61 in adjusted position. A layshaft 66 is mounted in bearings 68, 69 in the casing 62 this layshaft being parallel to the shaft 43. The layshaft carries a second pair of sheaves 70, 71. The sheave 70 is fixed on the layshaft. The sheave 71 is mounted on a bush 72, pinned thereto by pin 73, keyed to the layshaft by key 74 so as to be slidable along the layshaft, and is urged by a spring 75 towards sheave 70. An endless belt 76 connects sheaves 52, 53 drivably to sheaves 70, 71. A first toothed rotary element 80 in the form of a toothed wheel is fixed to the sleeve 48 by screws 81 and a second toothed rotary element 82 of smaller diameter is carried in fixed manner by the layshaft, being keyed thereto by key 83. A chain or slatted belt or similar toothed band 84 drivably connects the two toothed rotary elements together. Thus the sheaves and toothed rotary elements provide a reduction gearing between the sleeve 48 and shaft 43 which can be adjusted by adjusting the pin 61 to vary the transmission ratio for most purposes and if a greater change of ratio is required this can be readily achieved by replacing the gearing as a whole or changing a suitable part thereof such as the pulley 80.

A second gearing is located within the drum for drivably connecting the sleeve 48 with the drum. This gearing comprises a cage 82 which surrounds the tube 23 and is fixed thereto by a key 83. A spindle 84 is rotatably mounted in bearings 85, 86 in the cage parallel with the shaft 43. This spindle carries two sets of annular gearing teeth one of larger diameter than the other. The larger set is in the form of a gearwheel 87 and the smaller set is in the form of teeth 88 cut on the spindle to form in effect a pinion. The gearwheel meshes with a set of gearing teeth 89 on the sleeve 48 and the pinion 88 meshes with internal ring gearing teeth 90 on a gearing drum 91. The gearing drum 90 is located between the bearing plates 32, 33 and secured thereto by screws 92, 93.

The pulley thus has its total reduction gearing divided into a first gearing exterior to the pulley drum which is adjustable for varying the speed of the drum and a very simple internal gearing of fixed ratio.

Moreover, the motor is carried solely at its inner end whereby a standard motor can be used.

The tube 23 carries the first gearing at one end and the motor at the other end and outer bearings 30, 31 for the pulley drum and inner bearings 49, 50 for the drive sleeve 48 whereby a very firmly mounted device is achieved with simplicity of construction.

I claim:
1. A pulley device for driving a conveyor belt comprising a pulley drum, bearing means for rotatably mounting said drum, means for mounting an electric motor within one end of the pulley drum, a shaft co-axial with the pulley drum one end of which shaft projects out of the other end of the drum while the inner end of the shaft is located in such position that it can be connected to the spindle of the motor, a sleeve surrounding said shaft rotatably in relation to said shaft and projecting out of the said other end of the drum, a speed reduction gearing of variable ratio located outside the drum and drivably connecting said shaft to said sleeve, means outside the drum for varying the ratio of said gearing and a cage within the drum surrounding said sleeve, a mounting member located outside the drum and to which said cage and said bearing means are fixed, a layshaft carried by the cage, a pinion fixed on the sleeve, a gearwheel fixed on the layshaft in mesh with said pinion, a ring gear within the drum and fixed to the drum, and means drivably connecting the layshaft with said ring gear for driving the drum.

2. A pulley device for driving a conveyor belt comprising a pulley drum, mounting means located outside the said drum, an electric motor located within one end of the pulley drum, a shaft co-axial with the pulley drum one end of which shaft projects out of the other end of the drum while the inner end of the shaft is connected to the spindle of the motor, a sleeve surrounding said shaft rotatably in relation to said shaft and one end of which projects out of said other end of the drum, a speed reduction gearing of variable ratio located outside the drum and drivably connecting said shaft to said sleeve, means outside the drum for varying the ratio of said gearing, a tube within the drum surrounding said sleeve, one end of which tube projects out of said other end of the drum and is carried by said mounting while the other end of said sleeve is connected to the motor housing, bearings spaced apart from each other and mounted on said tube, bearing plates within the drum and connected thereto and running on said bearings, a cage surrounding said tube and fixed to it, a layshaft carried by the cage, a pinion fixed on the sleeve, a gearwheel fixed on the layshaft in mesh with said pinion, a ring gear within the drum and fixed to said bearing plates, and fixed ratio toothed gear means drivably connecting the layshaft with said ring gear for driving the drum.

3. A pulley device for driving a conveyor belt comprising a pulley drum, bearing means for rotatably mounting said drum, means for mounting an electric motor within one end of the pulley drum, a shaft co-axial with the pulley drum one end of which shaft projects out of the other end of the drum while the inner end of the shaft can be connected to the spindle of the motor, a sleeve surrounding said shaft and rotatable thereon and projecting out of said other end of the drum, a first pair of sheaves separably mounted on said shaft so as to rotate therewith, means for adjusting the degree of separation of said sheaves, a layshaft located outside the drum and offset from and parallel to said shaft, a second pair of sheaves mounted separably on said layshaft so as to rotate therewith and one of which is slidable separably from the other, spring means resisting the movement of the sliding sheave away from the other sheave, an endless belt connecting the first pair of sheaves with the second pair of sheaves, a first rotary element fixed on the sleeve, a second rotary element fixed on the layshaft, endless band means drivably connecting said rotary elements, a cage within the drum surrounding said sleeve, a mounting member located outside the drum and to which said cage and said bearing means are fixed, a cage surrounding said shaft and fixed to it, a layshaft carried by the cage, a pinion fixed on the sleeve, a gearwheel fixed on the layshaft in mesh with said pinion, a ring gear within the drum and fixed to the drum, and means drivably connecting the layshaft with said ring gear for driving the drum.

4. A pulley device for driving a conveyor belt comprising a pulley drum, mounting means located outside the said drum, an electric motor within one end of the pulley drum, a shaft co-axial with the pulley drum one end of which shaft projects out of the other end of the drum while the inner end of the shaft is connected to the spindle of the motor, a sleeve surrounding said shaft and rotatable thereon one end of which projects out of said other end of the drum, a first pair of sheaves separably mounted on said shaft rotatably therewith, means for adjusting the degree of separation of said sheaves, a first layshaft located outside the drum and offset from and parallel to said shaft, a second pair of sheaves mounted separably on said first layshaft and rotatable therewith and one of which is slidable separably from the other, spring means resisting the movement of the sliding sheave away from the other sheave, an endless belt connecting the first pair of sheaves with the second pair of sheaves, a first rotary element fixed on the sleeve, a second rotary element fixed on the first layshaft, endless band means drivably connecting said rotary elements, a cage within the drum surrounding said sleeve, a tube within the drum surrounding said sleeve, one end of which tube projects out of said other end of the drum and is connected to said mounting while the other end of said tube is connected to the motor housing, bearings spaced apart on said tube, bearing plates within the drum and connected thereto and running on said bearings, a second layshaft carried by the cage, a pinion fixed on the sleeve, a gearwheel fixed on the second layshaft in mesh with said pinion, a ring gear within the drum and fixed to said bearing plates, and fixed ratio toothed gear means drivably connecting the second layshaft with said ring gear for driving the drum.

5. A pulley device as claimed in claim 2 having a third bearing plate located within the drum at said one end of the drum, means for connecting this third bearing plate to one of the other bearing plates, a bearing carrying the third bearing plate rotatably, and mounting means outside said one end of the drum and carrying said bearing.

References Cited in the file of this patent

UNITED STATES PATENTS

| | | |
|---|---|---|
| 740,166 | McLauthlin | Sept. 29, 1903 |
| 1,313,537 | Jones | Aug. 19, 1919 |
| 1,614,031 | Holmes | Jan. 11, 1927 |
| 1,633,543 | Clark | June 21, 1927 |
| 2,540,099 | Christian | Feb. 6, 1951 |
| 2,555,016 | Trofimov | May 29, 1951 |
| 2,675,711 | LeTourneau | Apr. 20, 1954 |
| 2,736,209 | Christian | Feb. 28, 1956 |
| 2,915,167 | Berger | Dec. 1, 1959 |